May 25, 1954  G. A. KANE  2,679,138
CONTROL SYSTEM
Filed May 19, 1937  2 Sheets-Sheet 1

Characteristics in absence of piston 39 and valve 40

Characteristics of complete system

Inventor:
Garold A. Kane,
by Harry E. Dunham
His Attorney.

May 25, 1954 G. A. KANE 2,679,138
CONTROL SYSTEM
Filed May 19, 1937 2 Sheets-Sheet 2

Inventor:
Garold A. Kane,
by Harry E. Dunham
His Attorney.

Patented May 25, 1954

2,679,138

UNITED STATES PATENT OFFICE 2,679,138

CONTROL SYSTEM

Garold A. Kane, Scotia, N. Y., assignor to General Electric Company, a corporation of New York Application May 19, 1937, Serial No. 143,519

18 Claims. (Cl. 60—53)

This invention relates to control systems, more particularly to follow-up systems for controlling a driven object to move into positional agreement with a pilot device, and it has for an object the provision of a simple, reliable and improved system of this character.

More specifically, the invention relates to follow-up control systems in which the following or driven object is driven by an hydraulic transmission device, and a further object of the invention is the provision of improved means for controlling the hydraulic transmission device to drive the driven object into positional agreement with the pilot device in such a manner that oscillation or "hunting" of the driven object about the position of correspondence or agreement with the pilot device is substantially eliminated.

In carrying the invention into effect in one form thereof, an hydraulic transmission device is provided for driving the driven object, and means responsive to positional disagreement of the pilot device and driven object are provided for controlling the transmission device to drive the driven object toward positional agreement with the pilot device together with means responsive to the rate of change of positional disagreement of the pilot device and driven object for modifying the control of the hydraulic transmission device thereby to eliminate hunting.

Figure 1:
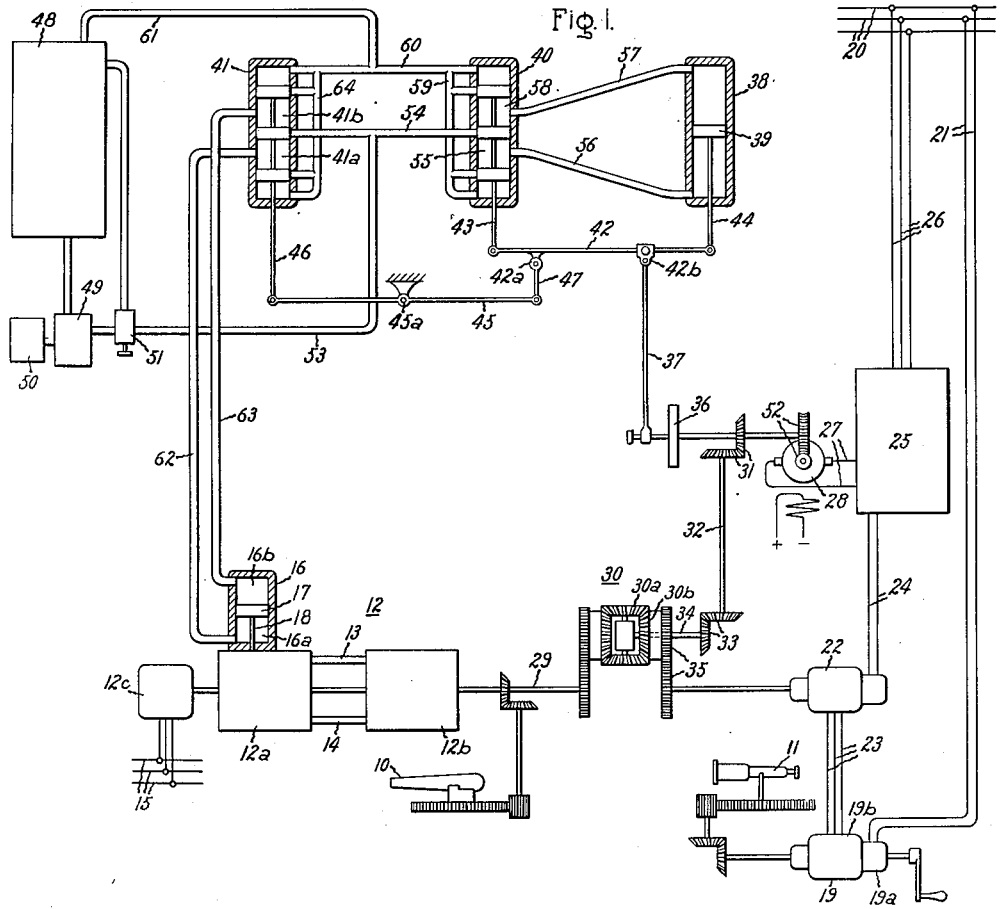
Figure 2:
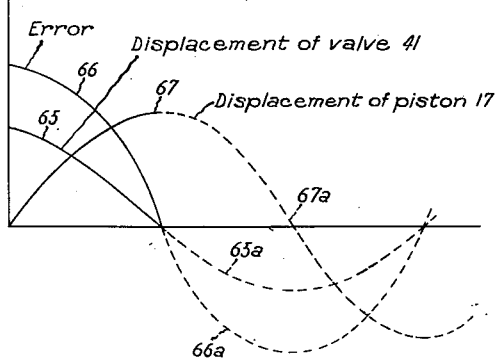
Figure 3:
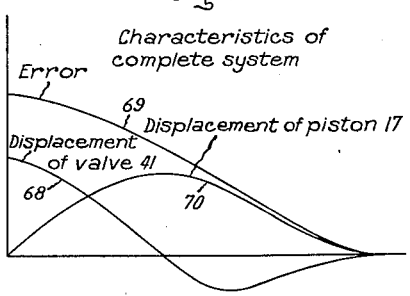
Figure 5:
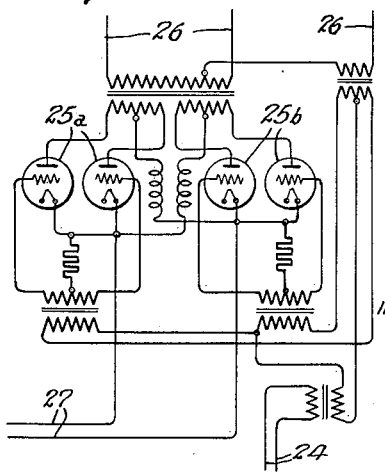
Figure 4:
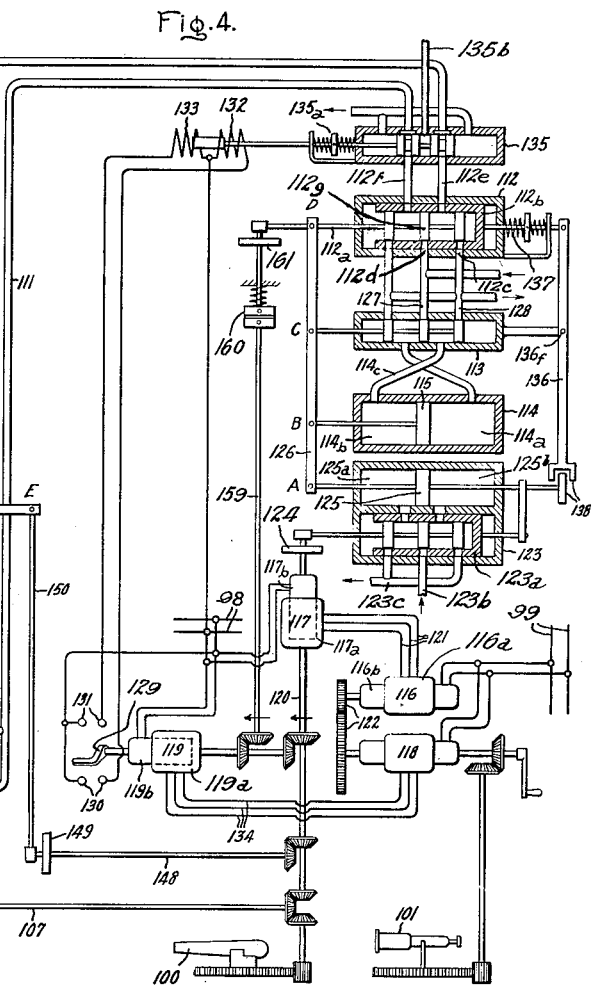
Figure 6:
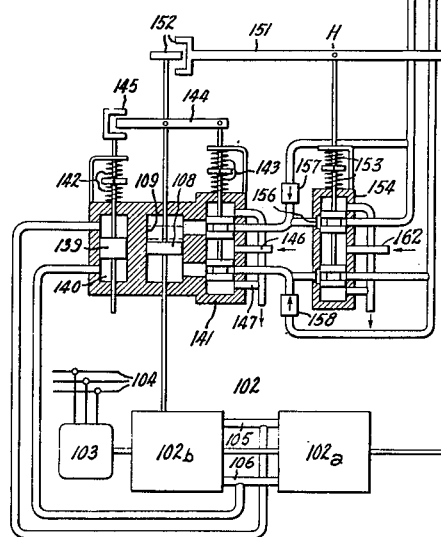
Figure 6:
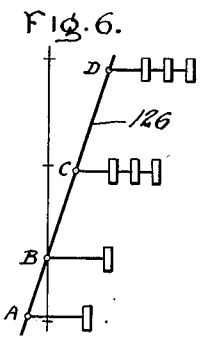
Figure 7:
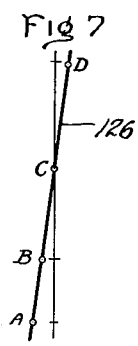
Figure 8:
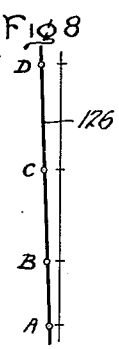

For a better and more complete understanding of the invention, reference should now be had to the following specification and to the accompanying drawing in which Fig. 1 is a simple, diagrammatical representation of an embodiment of the invention, Figs. 2 and 3 are charts of characteristic curves of operating characteristics serving to explain the manner in which the invention functions to eliminate hunting, Fig. 4 is a simple diagrammatical representation of a modification of the system of Fig. 1. Fig. 5 is a diagrammatical representation of the power tube amplifier unit employed in the system of Fig. 1, and Figs. 6, 7, and 8 are diagrammatical representations of operating positions of lever 126 at various points in the operation. In Figs. 6, 7, and 8, the movements of lever 126 from its zero position are exaggerated in order to illustrate the operation clearly.

Referring now to the drawing, an object such for example as a gun 10 is to be driven in accurate correspondence with a remotely located pilot device such as the telescope 11 of a director unit for all practical motions of the telescope by suitable driving means illustrated as an hydraulic transmission device 12.

Although this hydraulic transmission device may be of any suitable type, it is illustrated as comprising a variable stroke hydraulic pump 12a, an hydraulic motor element 12b connected to the pump by supply pipes 13 and 14 through which it receives a fluid, such as oil under pressure, one pipe serving at any one time as a supply pipe and the other as a return pipe. The pump is driven by suitable driving means, illustrated as an alternating current induction motor 12c which in turn is supplied from a suitable source represented by the three supply lines 15. The pump is provided with means for varying the stroke thereof. Since the structure of the pump itself constitutes no part of the present invention, the stroke varying means is not shown in the drawing. This stroke varying means, however, is actuated by suitable means illustrated as a cylinder 16 and a piston 17 slidably mounted therein. The piston is connected to the stroke varying means by means of connecting rod 18.

When the piston is in the central or zero position in which it is illustrated, the stroking mechanism is in its zero position and no oil is supplied to motor 12b. If the piston is moved upward from its zero position, the stroke varying mechanism is actuated to increase the supply of oil in one direction to the motor, and if moved downward from its zero position, the supply of oil to the motor is also increased but the flow is in the opposite direction. Thus the speed and direction of motor 12b depend upon the position of piston 17.

The telescope 11 is connected through suitable gearing to the rotor member of an electrical transmitting device 19. This transmitting device comprises a rotor member 19a provided with a single-phase winding (not shown), and a stator member 19b provided with a polycircuit distributed winding that is physically similar to a polyphase winding, in inductive relationship with the single-phase winding. As shown, the single-phase winding is supplied from a suitable source, such as one phase of the three-phase supply line 20 to which it is connected to conductors 21.

Receiving device 22 is in all respects identical in structure with transmitting device 19. The terminals of its distributed stator winding are connected by means of conductors 23 to electrically corresponding terminals of the stator winding of the transmitting device, and the single-phase rotor winding of the receiving device is connected by conductors 24 to the grid or input circuit of a tube amplifier 25 which in turn is supplied from source 20 to which it is connected by conductors 26. As shown in Fig. 5, amplifier unit 25 comprises a pair of electric valves 25a for supplying current to the output circuit in one direction and a second pair of electric valves 25b for supplying current to the output circuit in the opposite direction. Since tube amplifiers are well known and available on the market and further, since the particular structure of amplifier 25 per se constitutes no part of the invention, a detailed description is omitted. A substantially identical amplifier unit is disclosed and its operation is described in United States Patent No. 1,982,350, Mittag.

The output circuit of the amplifier is connected by means of conductors 27 to the armature of a small direct current electric motor 28.

The transmitting and receiving devices 19 and 22 respectively act as rotary transformers. Voltages are induced in the distributed winding of the transmitter which are transmitted to the distributed windings of the receiver as a result of which a voltage is induced in the single-phase rotor winding the magnitude and polarity of which depends upon the relative positions of the magnetic axes of the rotor windings of the transmitting and receiving devices. That is to say when the rotors are ninety electrical degrees out of correspondence with each other, there is no voltage induced in the rotor winding of the receiving device. If the rotor of the transmitting device is rotated ninety electrical degrees from this zero position in either direction while the rotor of the receiver is held, maximum voltage is induced in the rotor winding of the receiver. If the rotation is in one direction, the induced voltage will be of such a phase as to allow one pair of tubes e. g. pair 25a of the amplifier unit 25 to conduct current to the armature of motor 28 to cause it to rotate in one direction and if the rotation is in the opposite direction the induced voltage will be of the opposite phase which causes the other pair of tubes 25b to conduct current to the motor 28 so as to cause it to rotate in the opposite direction.

As shown, the output shaft 29 of the hydraulic transmission device is connected through a differential gear 30 to the rotor member of the receiving device. Motor 28 is also connected through differential gear 30 to the rotor of receiver 22. This last connection comprises the gearing 31, shaft 32, gearing 33, shaft 34, cage member 30a, output gear 30b, gearing 35 and rotor shaft of receiving device. Also, motor 28 is connected through crank 36, and crank arm 37 to a system of linkages and valves which controls the actuation of the piston 17 which in turn actuates the stroke varying means of the hydraulic transmission device.

If the output shaft of the hydraulic transmission device is maintained stationary, the rotor of the receiving device will be rotated by motor 28 through gearing 52, 31, shaft 32, gearing 33, shaft 34, cage member 30a, gear 30b, and gearing 35 to follow the motion of the rotor of the transmitting device as in any ordinary follow-up device. It is evident, therefore, that the total rotation of the motor 28 represents the lack of correspondence or the positional disagreement between the pilot device and the output shaft of the hydraulic transmission device. In other words, if the position of the rotor of the receiving device 22 with respect to the rotor of the transmitting device is such that no voltage is induced in the secondary winding of the receiving device, and the motor 28 has not rotated from its zero position, then the object driven by the output shaft of the transmission device 12 is said to be in correspondence with the pilot device. It is further evident that if the transmitting device 19 and the driven object rotate exactly together, the rotor of the receiving device 22 is driven through differential gearing 30 in correspondence with the rotor of the transmitting device and consequently, the motor 28 will not be energized and will not rotate. The total rotation of motor 28 therefore represents the error in the system or in other words the positional disagreement between the pilot device and driven object. The only other source of error is the electrical error existing between the transmitting device and the receiving device which produces the signal to the amplifier to cause rotation of the motor 28. This error is relatively so small that it will be neglected and the error, as measured by the rotation of the motor, will be called the system error.

The system of valves and linkages operated by the crank arm 37 for controlling the stroke varying mechanism of the hydraulic transmission device 12 comprises a cylinder 38 with a piston 39 movable therein, a pilot valve 40 for controlling the admission of fluid pressure to the cylinder 38, and a pilot valve 41 controlled by the piston 39 and valve 40 for in turn controlling the admission of fluid pressure to the cylinder 16. A link 42 serves to connect the valve stem 43 and the connecting rod 44. Similarly, a link 45 pivoted at 45a serves to connect the valve stem 46 with a link 47 that is pivotally connected to an intermediate point 42a of the link 42. It will also be noted that the crank arm 37 is pivotally connected to the link 42 at the point 42b.

Fluid pressure for the operation of the valves 40 and 41 and the pistons 17 and 39 is supplied from a pump 49 which receives oil from oil reservoir 48 and which is driven by any suitable driving means, such as electric motor 50. A pressure adjusting valve 51 is included in the discharge line of the pump, and this valve functions to maintain a given hydrostatic pressure on line 53 and to relieve excess pressure by allowing excess oil to return to the oil reservoir 48.

When any error exists in the system, that is to say when the telescope 11 is moved out of correspondence with the gun 10, the D.-C. motor 28 is energized and rotates a proportional amount as explained in the foregoing. Rotation of the motor 28 moves the system of levers from its zero positions through the worm gearing 52 and the crank 36 and crank arm 37. The pivot point 42b between the crank arm 37 and the link 42 is moved, accordingly necessitating movement of the valve stem 43 of valve 40 or movement of the piston 39. The piston 39 cannot move because the oil from the cylinder would have to be pumped out against pressure so the valve stem of valve 40 will move from the zero position in which it is illustrated. However, as soon as this motion occurs, the valve ports are opened so that oil is admitted to one side of the piston 39 and allowed to exhaust from the other side so that the piston 39 will move and continue to move as long as the valve 40 is open. This is accomplished as follows: Assume that the arm 37 moves upward, thus moving the valve stem 43 upward. The piston 39 acts as a temporary fulcrum for the lever 42. Oil under pressure from the oil pump is then admitted through pipes 53 and 54 into chamber 55, out pipe 56 into the space beneath the piston in cylinder 38, thus forcing the piston 39 upward. The oil from the space above the piston 39 is allowed to flow through the pipe 57 into chamber 58 and out the valve ports into the pipe 59 and through pipes 60 and 61 to the pressure tank 48. As the piston 39 is moved, the pivot point 42b acts as a fulcrum and the piston 39 moves until the valve stem 43 is restored to zero, which cuts off the oil supply to the cylinder 38 and the piston again comes to rest. The operation is such that if the arm 37 is moved at a given speed, the valve 40 opens an amount which allows oil to enter the cylinder 38 to move the piston at a rate proportional to that of the arm. Thus it may be said that the displacement of the valve stem 43 from its zero position is a direct measure of the speed of movement of the arm 37, and hence, is a measure of the rate of change of the error in the system. In this connection, it will be recalled that the total rotation of the D.-C. motor 28 represented the total system error. Since the arm 37 is driven by motor 28, the displacement of the crank arm 37 therefore also represents the total error of the system, and therefore, the rate of movement of the crank arm 37 represents the rate of change of system error. Since the piston 39 moves at a rate proportional to that of the crank arm 37, it thus becomes clear that the displacement of the valve stem 43 from its zero position is a direct measure of the speed of movement of the arm 37 and also of the rate of change of error in the system because the speed of movement of the piston 39 is proportional to the opening of the valve 40.

It will also be noted that the displacement of the pivot point 42a from its zero position is a measure of two quantities, (1) total system error, and (2) rate of change of error. The first of these is obvious. The second becomes clear when fast and slow movements of the arm 37 are considered. If arm 37 is moved rapidly, the pivot point 42a will also be moved to its extreme position before the piston 39 can move to close the valve 40 and restore the point 42a toward its zero. On the other hand, if the arm 37 moves slowly, the valve 40 opens and the piston 39 moves to close the valve and restore the point 42a before it has been displaced very far from its zero position. So the position of the point 42a depends very definitely upon the speed of movement of the arm 37 and therefore upon the rate of change of system error.

Now for a very slow motion of the arm 37, i. e. for very low values of the rate of change of the error, the valve 40 remains very nearly on zero, and a displacement of the valve stem 46 proportional to the displacement of the arm 37 occurs because if the valve 40 remains on zero, the lever 42 tilts and moves the upper end of the link 47, which motion is transmitted by means of the lever 45, fulcrum 45a, and link 46 to the valve 41. Furthermore, if the speed of motion of arm 37 is increased, thus necessitating that valve 40 open wider, a proportion of the displacement of the stem of valve 40 is also transmitted through the stem 47 and lever 45 and link 46 to the valve 41. Thus it is evident that the displacement of the valve stem of valve 41 consists of two components, one due entirely to the amount of movement of the arm 37 with valve 40 considered as stationary, and the second due to any displacement of valve 40 with arm 37 considered stationary. Therefore, the displacement of the valve stem 46 of valve 41 from zero depends upon the error as given by the displacement of the arm 37 and also on the rate of change of error as measured by the displacement of the valve 40. In other words, the opening of valve 41 is a function both of the error and of the rate of change of error of the system. The interconnecting links act as a differential gear, adding the two components described in the foregoing and transmitting the sum thereof to the valve 41. If the valve 41 is moved from zero, e. g. in a downward direction, then oil is admitted under pressure into chamber 41b and through pipe 63 into chamber 16b. This of course causes the piston 17 to move downward forcing oil from the chamber 16a through pipe 62 into chamber 41a, and out through pipes 64 and 61 to the oil tank 49. As the piston 17 moves from its zero or mid-position, it moves the stroke control mechanism of the hydraulic pump 12a in such a manner that the quantity and the direction of oil flow to the hydraulic motor 12b is controlled. The speed of rotation of the output shaft of the hydraulic transmission device is directly proportional to the displacement of piston 17 from its zero or mid-position. Consequently the acceleration of the output shaft is proportional to the speed of the piston which of course is proportional to the opening of valve 41. Since the opening of valve 41 is a function of both the error and the rate of change of error of the system, as explained in the foregoing, it follows that the acceleration of the output shaft of the hydraulic transmission is a function of the error and also of the rate of change of error of the system.

In the foregoing the terms "error," and "rate of change of error" are used interchangeably with the terms "positional disagreement" and "rate of change of positional disagreement" respectively.

From the foregoing it will be understood that for a given constant error, the output shaft of the hydraulic transmission device will accelerate and for the same given magnitude of error but one that is still increasing, the acceleration of the output shaft will be proportionately larger and will remain larger until the speed of the gun becomes equal to the speed of the telescope. At the instant at which the speed of the gun becomes equal to the speed of the telescope, the error becomes constant momentarily, and the rotor of the receiver 22 is driven by output shaft 29 through the differential gearing 30 in correspondence with the rotor of the transmitter 19, and therefore, neither pair of tubes 25a or 25b of the amplifier 25 is energized and motor 28 is therefore at rest. The output shaft of the transmission device 12 is still accelerating. When the speed of the gun becomes greater than the speed of the telescope, the rate of change of error becomes negative, i. e. it begins to decrease. As the speed of the gun becomes greater than the speed of the telescope, it drives through the differential gearing 30 and rotates the rotor of the receiver 22 from its position of correspondence in such a direction that the other pair of tubes of the amplifier 25 is rendered conducting and the motor 28 caused to rotate in the opposite direction to move the arm 37 downward. As before, the piston 39 acts temporarily as a fulcrum and the left-hand end of link 42 is pulled downward, thereby opening valve 40. If the rate of change of error is sufficiently great in comparison with the magnitude of the error itself, i. e., if the rate of change of error is relatively large and the error relatively small, it will be seen that the component of downward displacement of pivot point 42a caused by downward displacement of valve stem 43 will be greater than the component of upward displacement of pivot point 42a caused by upward displacement of pivot point 42b which is produced by the positive error still remaining in the system.

As a result, pivot point 42a will move downward, and valve stem 46 will move upward to close valve 41. This stops the downward movement of piston 17 and causes the transmission device 12 to operate at constant speed. If the rate of change of error is still sufficiently great, i. e. if the error continues to decrease at a sufficient rate, the pivot point 42a will continue to move downward past its zero position, and the valve stem 46 will continue to move upward past its zero position to open the valve 41 and supply fluid under pressure to the space beneath piston 17. As a result, the speed of the transmission device 12 will decrease. The various constants of the system may be adjusted so that during this period when the error is decreasing, the valve stem 46 is maintained in its upward position sufficient to decrease the speed of the transmission at such a rate that by the time the error has reduced to zero, the speed of the driven object has decreased to a speed equal to that of the pilot device, i. e. telescope, and at that instant, valve stem 46 reaches zero and piston 17 stops so that constant speed operation of the transmission results. Hence the driven object will be maintained in exact correspondence with the pilot device.

If the error had been in the reverse direction initially, the operation would have been similar but the reverse of the operation described in the foregoing. Thus, whether the error and rate of change of error both be positive or both be negative, or whether one be positive and the other negative, the displacement of the pivot point 42a from its zero point and the displacement of valve stem 46 from its zero point are each equal to the sum of components of displacement proportional to error and rate of change of error, and occupy positive or negative positions on either side of their zero positions depending upon the relative magnitude of these components.

The operation just described may be briefly summarized as follows:

If a given error exists, for any reason, the output shaft will accelerate and will eventually reach a speed above that of the pilot device. Now a certain error exists but on account of the speed of the output shaft being greater than that of the pilot device, the error will be decreasing. There will be a period, therefore, when a positive error exists simultaneously with a negative rate of change of error. Consequently, the acceleration of the output shaft will be reduced to zero and the acceleration will also be reversed before the error itself has decreased to zero. Thus as the error reduces toward zero, the output shaft decelerates to a speed equal to the speed of the pilot device, and initial adjustments are so made that the speed of the output shaft of the transmission device becomes equal to the speed of the pilot device at the instant the error becomes zero, and thus stable operation is obtained at this speed with no further change in error. The "overshooting" or "hunting" is eliminated because it is not necessary tto reverse the error in order to decelerate the output shaft to the proper speed.

The manner in which the piston 39 and valve 40 function to prevent hunting will best be understood by first considering the operation of the system in the absence of these elements. It is to be recalled at this point that the existence of an error between the pilot device and the driven object controls the acceleration of the output shaft of the hydraulic transmission device and not the velocity. Now if the piston 39 and valve 40 were eliminated, one of the two components of displacement of the valve 41 would also be eliminated, and the displacement of the valve 41 would be exactly proportional to the displacement of the arm 37 or directly proportional to the error. Now, if a certain error exists, the valve 41 would be open a given amount and since this controls the acceleration of the load, the latter would start to move in a direction to decrease the error and to close the valve 41. The motion of the valve 41 would therefore be proportional to the error, as shown on curves 65 and 66 of Fig. 2, in which the curve 65 represents the motion of the valve 41 and the curve 66 represents the error. When the error has become reduced to zero and the valve 41 has closed, the piston 17 has, however, continued during this period to move in such a manner as represented by the curve 67 of Fig. 2. Thus, at the time the error becomes zero, the piston 17 is not in its zero position and consequently, the load will continue to rotate, driving through the position of correspondence or positional agreement so that the error reverses and continued oscillation, as shown by the dotted curves 65a, 66a and 67a, is established.. In order to prevent these oscillations, i. e. in order to eliminate hunting, it is evident that the error, the opening of the valve 41, and the position of the piston 17 must all reach zero at the same instant.

Now consider the same initial conditions but with the devices 39 and 40 acting in the manner described in the foregoing. The conditions will be as shown by the curves 68, 69 and 70 of Fig. 3, in which the curve 68 represents the displacement of valve 41, the curve 69 represents the error of the system, and the curve 70 represents the displacement of the piston 17. The piston 17 will start to move exactly as in the previous case and the error will start to become zero. Valve 40 will then start to move so as to decrease the valve opening of valve 41, and hence, diminish the speed of piston 17 and thus thereby diminish the acceleration of the load in comparison with the condition shown in Fig. 2. As the error decreases, valve 41 reaches the zero position appreciably before the error becomes zero and actually reverses, as indicated by the curve 68. Thus before the error becomes zero, the valve 41 is reversed and the piston 17 starts back to its zero position, as indicated by the curve 70.

The various system constants are initially adjusted so that when the error has decreased to zero, the piston 17 has also returned to zero and the valve 41 returns to zero. Thus the oscillations are damped out and stable operation without hunting is obtained.

In the modification of Fig. 4, the driven object, illustrated as a gun 100, is driven to follow the motion of a pilot device, such as telescope 101, by means of the hydraulic transmission device 102. This device comprises an hydraulic motor 102a supplied with a fluid such as oil from a pump 102b which in turn is driven at a speed which is preferably substantially constant by suitable means such as the alternating current motor 103 which is supplied from the source 104. Connections 105 and 106 complete a fluid circuit between the pump and motor. Motor 102a is provided with an output shaft 107 which is connected through gearing to gun 100.

Pump 102b is provided with suitable means for controlling the speed and direction of rotation of shaft 107. Such means preferably constitutes mechanism for varying the stroke of the pump pistons. Since this mechanism per se constitutes no part of the present invention, it is omitted from the drawing. Suitable means for actuating the speed control means is illustrated in the form of a piston 108 movable in a cylinder 109. When the piston is in the central or zero position in which it is shown, no oil is supplied to the motor and the motor is accordingly at standstill, and when the piston 108 is displaced from this position the motor 102a rotates at a speed and in a direction dependent upon the amount and direction of the displacement.

Fluid such as oil is supplied to cylinder 109 for actuating the piston 108 through connections 110 and 111. The supply of fluid through connections 110 and 111 is under the control of means responsive to the positional disagreement between pilot device 101 and driven object 100 and also to the rate of change of this positional disagreement. The term "error" or "system error" is also used to denote this positional disagreement. The means responsive to the error and rate of change of error for controlling the supply of oil to actuate piston 108 comprises a valve 112 and a cylinder and piston 114, 115. These elements correspond in function to the valve 41, valve 40 and cylinder and piston 38, 39 of Fig. 1. In view of this correspondence, a detailed description is omitted.

In Fig. 1, piston 39 was actuated by an electrical torque amplifier 25, 27, 28. In the modification of Fig. 4, this electrical torque amplifier is replaced by an hydraulic torque amplifier actuated by a high speed, high accuracy or "fine" motion transmitting and receiving system. A low speed, low accuracy or "coarse" electrical motion transmitting and receiving system is also provided for controlling the hydraulic transmission when the error between the driven object and pilot devices exceeds a predetermined maximum value such as 2½°.

The high speed motion transmitting system comprises the transmitting device 116 and receiving device 117, and the low speed transmitting system comprises the transmitting device 118 and receiving device 119. These transmitting and receiving devices are in all respects identical with transmitting and receiving devices 19 and 22 of Fig. 1 with the exception that the single phase rotor windings of receivers 117 and 119 are connected to a single phase source of supply represented by the two lines 98 which source is preferably the same source as the single phase source represented by the two lines 99 from which the single phase rotor windings of the transmitters 116 and 118 are supplied. The member 117a of high speed receiver 117, usually referred to as the stator member, is mechanically connected through shaft 120 and gearing to driven object 100 and electrically connected to the high speed transmitting device 116 by means of connections 121. The rotor member 116b of high speed transmitting device 116 is connected through gearing 122 to pilot device 101.

As thus connected and energized, the rotors of receivers 117 and 119, if unrestrained, will remain in correspondence with the rotors of the transmitters 116 and 118 to which they are respectively electrically connected. The zero positions of the rotors 117b and 119b are the positions these rotors occupy when unrestrained and the gun 100 is in positional agreement or correspondence with the telescope 101.

If stator 117a is held stationary while rotor 116b is rotated, rotor 117b will reproduce the motion of rotor 116b. On the other hand, if stator 117a is rotating at the same speed as the rotor 116b, the axis of its magnetic field will remain stationary in space and the rotor 117b will remain at rest. Similarly, if stator 117a is rotating at a speed that is different from that of the rotor 116b, rotor 117b will rotate at a speed equal to the difference in speeds of rotor 116b and stator 117a. Since stator 117a is mechanically coupled to the output shaft 107 of transmission 102, rotation or displacement of the rotor 117b from its zero position is therefore the difference in positions of the pilot device and output shaft and hence it is the error between gun 100 and telescope 101. The operation of the low speed or "coarse" electrical motion transmission system comprising transmitter 118 and receiver 119 is the same as the operation of the high speed system except that it runs more slowly. Usually the low speed transmitter and receiver are geared to the telescope and gun respectively at a 1:1 ratio, whereas the high speed transmitter and receiver may be geared to the telescope and gun respectively at a much higher ratio, such for example as 36:1 in order to obtain sufficient accuracy.

The stem of a valve 123 is mechanically connected to the rotor member 117b of the high speed receiving device through the crank arm 124 so that the motion of this valve stem from zero is proportional to the error of the system. The piston 125 is mechanically connected to the sleeve 123a so that the motion of the piston 125 follows the motion of the valve stem of valve 123. This is accomplished as follows: Displacement of stem of valve 123 from its zero position, e. g. to the right, uncovers the valve ports and admits fluid under pressure through pipe 123b, lower central port of valve 123, out upper left ports in sleeve 123a and valve casing to the space 125a. This causes piston 125 to move to the right and force fluid from chamber 125b through right-hand ports and out pipe 123c. Piston 125 in moving to the right also moves the sleeve 123a to the right until the ports in the sleeve 123a are again cut off by the lands on stem of valve 123. Thus this valve and piston form the first stage of amplification which replaces the electric valve and motor amplifier 25, 27, 28 of Fig. 1. The displacement of the point A of the lever 126 is therefore directly proportional to the motion of the rotor 117b of receiving device 117, or it is proportional to the system error.

The piston 115 and the stem of the valve 113 are attached to the lever 126 at points B and C respectively, and form an ordinary hydraulic follow-up control. If the point A, for example, is moved to the left, the point C will move to the right sufficiently to allow oil under pressure to enter port 127 into chamber 114a, forcing the piston 115 to the left, the oil being forced out of 114b through port 114c, through the valve 113 and out port 128 and back to the oil pressure reservoir. It is evident that the faster the point A is moved, the larger the opening of valve 113 must be in order to give an increased speed to the piston 115. Thus, the displacement of the point C from its zero position is a direct measure of the speed at which the point A is moving. The displacement of the point D from its zero position is a function of the displacement of the point A which displacement is proportional to system error, and is also a function of the displacement of point C which displacement is proportional to the rate of movement of point A, or in other words, to the rate of change of error. Thus point D corresponds to point 42a in Fig. 1 and its displacement like the displacement of point 42a is proportional both to system error and rate of change of error. The valve stem 112a is directly connected to the point D of lever 126, and the displacement of this valve stem from its zero position controls the flow of oil to the piston 108 which is connected to actuate the stroke varying means of the pump 102b. Since the displacement of the point D from zero is proportional to the error, and also to the rate of change of error, the acceleration of the output shaft of the hydraulic motor 102a is proportional to the error and also to the rate of change of error as explained in the description of the operation of the system of Fig. 1. With the proportionality properly adjusted, this results in a stable follow-up mechanism. The operation of this system as thus far described is substantially identical to the operation of the system of Fig. 1.

The operation may be summarized as follows: Assume the telescope 101 to be moved rapidly in a direction such that the rotor 117b of receiver 117 moves the stem of valve 123 to the left. Piston 125 will be moved to the left a proportional amount in response to the admission of pressure fluid to space 125b. As a result, lever 126 will pivot about point B as a fulcrum since piston 115 has not yet started to move. Consequently point A of lever 126 is moved to the left and point D is moved to the right, so that the lever 126 occupies a position as indicated schematically in Fig. 6. Thus, the movement of point A to the left represents the system "error." This movement of lever 126 results in opening valve 112 so that pressure fluid is supplied through pipe 112f, valve 135 and pipe 111 to produce a rapid acceleration of stroke piston 108 which in turn results in rapid acceleration of the hydraulic motor 102a and its drive shaft 107.

While the foregoing action is taking place, pressure fluid is admitted to chamber 114a as a result of the movement of point C to the right and the opening of valve 113. As a result, pivot B of lever 126 is moved to the left, thereby moving lever 126 in a counterclockwise direction about pivot A, so that lever 126 approaches the position shown diagrammatically in Fig. 7. It will be noted that point D has been moved toward the left from its Fig. 6 position thereby partially closing valve 112 and decreasing the acceleration of motor 102a and the gun 100 and receiver 117 driven thereby. As the speed of the gun finally becomes greater than the speed of the telescope, the gun begins to approach a position of correspondence with the telescope. In other words, the "error" begins to decrease. The stator 117a of the receiver 117 is now being driven at a greater speed than the rotor 117b and in the reverse direction. As a result, the rotor 117b begins to rotate in the reverse direction in space so as to move the stem of valve 123 to the right thereby admitting pressure fluid to chamber 125a. This causes piston 125 to move to the right so as to rotate lever 126 in a counterclockwise direction about point B. As a result, point D moves to the left and in so doing closes valve 112 thereby stopping the motion of stroke piston 108 and stopping the acceleration of motor 102a and gun 100. However, since the speed of the gun is now greater than the speed of the telescope, the rotor of receiver 117 will continue to rotate in the reverse direction and continue to move point A to the right and point D to the left. By referring to Fig. 7 it will be noted that point D will reach its zero position before point A reaches its zero position because the linkage again pivots about point B. As the motion continues, point D passes through its zero position and opens valve 112 in the reverse direction to cause pressure fluid to be supplied through pipe 112e to move stroke piston 108 in the reverse direction to decelerate motor 102a as indicated diagrammatically in Fig. 8. It will be noted that this action takes place before the error between the gun and telescope becomes zero. In other words, deceleration of the gun begins before it reaches a position of correspondence with the telescope and the speed of the gun is decreased to the speed of the telescope while the gun is approaching correspondence with the telescope.

The movement of point D past its zero position to the left also moved point C past its zero position to the left thereby opening valve 113 to admit pressure fluid to cylinder 114 to move piston 115 to the right. This causes lever 126 to move in a clockwise direction about point A toward its zero position thereby closing valves 112 and 113 and stopping the reverse movement of stroke piston 108 and also stopping the deceleration of the gun.

In the final or zero position of the linkage, point A and all the valves are restored to their respective zero positions. The stroke piston has come to a definite and stationary "on stroke" position and the motor 102a drives the gun at constant velocity.

When the telescope is either accelerated or decelerated from the speed at which it is being moved, a new "error" results and the sequence of operation described in the foregoing is repeated in a positive or negative direction depending upon whether the initial motion of point A is to the left or to the right.

In order to reduce the effect of lost motion in the linkage 126 which would introduce a certain time lag between the motion of the output shaft 107 and the responding motion of the point D, the shaft 159 directly geared to output shaft 107, the friction member 160, and crank arm 161 connected to point D are provided. A small displacement of output shaft 107 will rotate the stator of the receiving device 117 which in turn causes a similar rotation of the rotor and a displacement of stem of valve 123 and a corresponding displacement of piston 125. Now if lost motion exists in linkage 126, there will be no displacement of valve stem 112a until the displacement of piston 125 exceeds the amount of lost motion. Under these conditions a time lag would exist between the motion of the output shaft 107 and the response of valve stem 112a. The shaft 159 is therefore rigidly geared to output shaft 107 and drives the crank arm 161 through the friction clutch 160 to take up the lost motion so that small movement of the output shaft 107 is directly transmitted to valve stem 112a even though some lost motion exists in linkage 126. After valve stem 112a has been moved sufficiently to take up the lost motion, the friction device 160 merely slips and subsequent motion of valve stem 112a results from motion of piston 125 as previously described.

The low speed receiving device 119 has a movable contact member 129 connected to its rotor member 119b so as to rotate therewith. This movable contact member is arranged to engage with and bridge one or the other of the pairs of stationary contacts 130, 131. Contacts 130 are included in the circuit of a solenoid 132, and contacts 131 are included in the circuit of a solenoid 133, as illustrated. The stator member of the low speed receiving device 119 is mechanically connected to the output shaft 107 of the hydraulic transmission and electrically connected by means of conductors 134 to the low speed transmitting device 118 in the director. Thus, the motion of the rotor member 119a of the low speed receiving device is proportional to the error between the gun and the telescope. If, for any reason, the error is greater than say, 3°, the rotor member of the low speed receiving device will be off zero by a corresponding amount and will close one or the other of the pairs of contacts 130, 131, depending upon the direction of error between the telescope and gun, thereby to energize one of the solenoids 132 or 133. This in turn pulls the stem of the valve 135 off zero. This blocks the flow of oil from the valve 112 through the connections 110, 111 to the piston 108 so that the high speed control elements are rendered ineffective and at the same time it completely uncovers one of the ports leading to pipes 110, 111 and establishes communication between the oil pressure source through pipe 135b and one of the pipes 110, 111. Now, the oil supplied to the piston 108 is controlled by the valve 135 so that the piston 108 is moved in the proper direction to cause the output shaft to rotate towards correspondence at maximum speed. When the output shaft has rotated to within, say, 2½° of correspondence, the contacts 130, or 131, as the case may be, open so that the solenoid 132 or 133 is deenergized and the valve 135 is returned to zero by its centering springs 135a, thus restoring the control of the piston 108 to the high speed mechanisms which operate in the manner described in the description of the operation of Fig. 1, to bring the output shaft into exact correspondence with the pilot device 101.

In order to prevent a large overtravel of the gun 100 when synchronizing, the lever 136 operated by piston 125 and the centering spring 137 operating on the sleeve 112b of the valve 112 are incorporated. It will be noted that the fulcrum 136f of lever 136 is on the center line of the valve 113. For small errors which involve relatively small motions of the piston 125, the lever 136 remains stationary because of the lost motion device 138. However, for larger errors which result in larger motions of the piston 125, the valve sleeve 112b is moved an amount proportional to the motion of the piston 125 and in the same direction as the displacement of valve stem 112a. It is thus apparent that even for large motions of the piston 125, the net relative motion between the stem and sleeve of the valve 112 is relatively small, except for that component of motion of the valve stem 112a caused by a displacement of the point C of the lever 126 from its zero position, i. e. the component produced by rate of change of error. Now, if the gun is approaching synchronism at high speed, at the instant the low speed contacts open to retransfer the control to valve 112 and the high speed or "fine" control system which actuates valve 112, the error may be as large as 2½°, but the rate of change of error will be quite high so that the net opening of the valve 112, which with these high errors is effected primarily by the rate of change of error, as previously described, will be in such a direction as to admit oil to the piston 108 so as to slow down the output shaft even though the error is still as large as 2½°. For example, if point A has previously been moved to the right in accordance with the system error and point D has been moved to the left in accordance with this error and the rate of change of error as explained in the foregoing, the central valve land 112g has also been moved to the left. The displacement of piston 125 to the right has taken up the lost motion in device 138 and has rotated the lever 136 in a counterclockwise direction about pivot 136f to move sleeve 112b to the left less than the leftward displacement of point D so that port 112d is open at the lower right-hand edge of land 112g.

Now when the low speed contacts open in response to decreasing error and the point D moves to the right in response to the negative rate of change of error, a very small movement of the valve stem results in closing port 112d at the lower right-hand edge and uncovering the port 112d at the lower left-hand edge. In other words, the valve 112 has been reversed with considerably less motion of the valve stem 112a than would ordinarily be required to move the central land 112g across the port 112d and thus the reversal is accomplished more rapidly than it would be in the absence of sleeve 112b and its operating mechanism.

The opening of the low speed contacts results in centering the valve 135 so that the reversal of valve 112 supplies oil under pressure through pipe 111 to the space beneath the piston 108. This causes piston 108 to move in the reverse direction to decelerate the transmission device and gun. In other words, deceleration begins while the error is still positive. Thus the system anticipates the point of correspondence and decreases its speed accordingly. This results in synchronization which is much less abrupt than would otherwise be attained.

In order to prevent overloading of the hydraulic transmission unit caused by the operation of the controls or by a high friction load, a device to limit the possible horsepower transmitted is incorporated. This device consists of the piston 139 movable in a cylinder 140, which cylinder is preferably formed in the same cylinder block with the cylinder 109. The horsepower limiting mechanism also comprises the valve 141, also preferably formed in the cylinder block with cylinders 109 and 140, and arranged in the connections 110, 111 between the cylinder 109 and the control mechanism. Centering springs 142 and 143 are provided for biasing the piston 139 and the valve 141 towards their zero positions. A link 144 is connected to the stem of valve 141 and also to the connecting rod of piston 108. This link 144 cooperates with a lost motion device 145 on the connecting rod of piston 139. The displacement of piston 139 from its zero or center position is a measure of the hydraulic pressure across the hydraulic motor 102a. The speed of the hydraulic motor may be measured by the displacement of the piston 108 which actuates the stroke varying mechanism of the pump 102b to vary the speed of the motor 102a. Connections are so made that if the piston 108 moves upward from its zero position, the resulting pressure on the motor 102a causes the piston 139 to move downward. Thus when a certain limiting combination of speed and pressure occurs, the lost motion in the device 145 is taken up and the valve stem of valve 141 will be moved upward from its zero position. This motion of the valve stem 141 stops the flow of oil to the piston 108 from all other sources, and oil under pressure is admitted to the piston 108 through the port 145 and out of the cylinder 109 through the port 147 of the valve 141 and back to the tank. This reduces the stroke of the pump and hence the speed of motor 102a so that the output horsepower is reduced to the allowable value. The centering spring 143 then returns the valve stem of valve 141 to its zero position, and normal operation is resumed.

Usually a gun such as the gun 100 is mounted in such a place that it cannot rotate continuously, and accordingly, rigid mechanical stops are provided. It is necessary, therefore, to incorporate a control device that will prevent the hydraulic transmission from driving the gun into the mechanical stops under power. This device comprises the shaft 148 geared to the gun, crank arm 149, levers 150 and 151, lost motion mechanism 152, centering springs 153, and valve 154. The operation of this feature is as follows:

As the gun 100 approaches a stop, the point E of lever 150 is moved vertically, and the lever 151 pivoting about the point H takes the lost motion out of mechanism 152 and raises the valve stem of valve 154. At this point in the operation, the piston 108 is in the dotted line position above its central or zero position. The valve 154 now blocks the flow of oil through pipe 111 to the piston 108 from valves 112 and 135, and admits oil to the space above the piston 108 from the pressure tank through pipe 162 and the port 156 of the valve 154, which forces the piston 108 downward towards its central or zero position so that the speed of the transmission is reduced as the gun approaches the mechanical stop, and just before the mechanical stop is reached, the speed is reduced to zero. If the action of the control is such as to cause the gun to rotate away from the mechanical stop, no restriction is imposed by the valve 154, as the flow of oil from the control valves 112 or 135 may pass to the piston 108 through the check valves 157 and 158.

Although in accordance with the provisions of the patent statutes this invention is described as embodied in concrete form, it will be understood that the apparatus shown and described is merely illustrative and that the invention is not limited thereto, since alterations and modifications will readily suggest themselves to persons skilled in the art without departing from the true spirit of the invention or from the scope of the annexed claims.

What I claim as new and desire to secure by Letters Patent of the United States is:

1. A follow-up system for controlling a driven object to move into correspondence with a pilot device comprising an hydraulic transmission device for driving said object, said hydraulic device having an output shaft connected to said driven object and a device for controlling the speed of said shaft, means responsive to positional disagreement of said pilot device and driven object for actuating said control device to cause said driving means to drive said object toward correspondence with said pilot device, and means responsive to the rate of change of said positional disagreement for modifying the actuation of said control device thereby to eliminate hunting.

2. A follow-up system for controlling a driven object to move into correspondence with a pilot device comprising an hydraulic transmission device for driving said object, said hydraulic device having an output shaft connected to said driven object and a device for controlling the speed of said shaft, means responsive to positional disagreement of said pilot device and driven object for actuating said control device to cause said driving means to drive said object toward correspondence with said pilot device, and means responsive to the positional disagreement of said pilot device and object and to the rate of change of said disagreement for modifying the actuation of said control device thereby to prevent hunting.

3. A follow-up system for controlling a driven object to move into positional agreement with a pilot device comprising in combination, an hydraulic transmission device for driving said object, said hydraulic device comprising a variable stroke pump and an hydraulic motor supplied therefrom and having a control device for varying the stroke of said pump, means responsive to positional disagreement of said pilot device and driven object for actuating said stroke control device to cause said hydraulic transmission device to drive said object toward correspondence with said pilot device and means responsive to the rate of change of said positional disagreement for modifying the actuation of said stroke control device to prevent hunting.

4. A follow-up system for controlling a driven object to move into positional agreement with a pilot device comprising in combination, an hydraulic transmission device for driving said object, said hydraulic device comprising a variable stroke pump and an hydraulic motor supplied therefrom and having a control device for varying the stroke of said pump, means responsive to positional disagreement of said pilot device and driven object for actuating said stroke control device to cause said hydraulic transmission device to drive said object toward correspondence with said pilot device and means responsive to the positional disagreement and to the rate of change of said positional disagreement for modifying the actuation of said stroke control device to prevent hunting.

5. A follow-up control system for controlling a driven object to move into positional agreement with a pilot device comprising an hydraulic transmission device for driving said object, said transmission having a variable stroke hydraulic pump, an hydraulic motor supplied from said pump, and means for varying the stroke of said pump to control the acceleration of said motor, actuating means for said stroke varying means comprising a cylinder, a piston movable therein and connected to said stroke varying means, and means responsive to the rate of change of positional disagreement of said pilot device and object for actuating said piston thereby to control the acceleration of said hydraulic motor in accordance with said rate of change of positional disagreement.

6. A follow-up control system for controlling a driven object to move into positional agreement with a pilot device comprising an hydraulic transmission device for driving said object, said transmission having a variable stroke hydraulic pump, an hydraulic motor supplied from said pump, and means for varying the stroke of said pump to control the acceleration of said motor, actuating means for said stroke varying means comprising a cylinder, a piston movable therein and connected to said stroke varying means, and means responsive to the positional disagreement of said pilot device and driven object and to the rate of change of said positional disagreement for actuating said piston thereby to vary the acceleration of said hydraulic motor in accordance with said positional disagreement and said rate of change.

7. A follow-up system for controlling a driven object to move into positional agreement with a pilot device comprising an hydraulic transmission device for driving said object, said transmission device comprising a variable stroke pump, an hydraulic motor supplied from said pump and a device for controlling the stroke of said pump thereby to control the acceleration of said motor, means for actuating said stroke varying device comprising a cylinder and a piston movable therein and connected to said stroke varying device, a valve for controlling the supply of fluid pressure to said piston, and means responsive to positional disagreement of said pilot device and driven object for opening said valve to admit fluid under pressure to said cylinder to move said piston thereby to cause said motor to drive said object toward correspondence with said pilot device, and means responsive to the rate of change of said positional disagreement for modifying the opening of said valve to vary the acceleration of said motor in accordance with the rate of change of said positional disagreement.

8. A follow-up system for controlling a driven object to move into positional agreement with a pilot device comprising an hydraulic transmission device for driving said object, said transmission device comprising a variable stroke hydraulic pump, an hydraulic motor supplied therefrom, and means for varying the stroke of said pump, means for actuating said stroke varying means comprising a cylinder and a piston movable therein and connected to said stroke varying means, a valve for controlling the supply of fluid pressure to said cylinder to effect movement of said piston, means responsive to positional disagreement of said pilot device and driven object for controlling the opening of said valve, and means responsive to the rate of change of said positional disagreement for modifying the opening of said valve, comprising a second cylinder and piston movable therein, a second valve for controlling the supply of fluid to said second cylinder, a connection between said second valve and second piston and a connection between said connection and said first valve.

9. A follow-up system for controlling a driven object to move into positional agreement with a pilot device comprising in combination an hydraulic transmission device for driving said object, said transmission device comprising a variable stroke hydraulic pump, an hydraulic motor supplied from said pump, and means for varying the stroke of said pump, means responsive to positional disagreement of said pilot device and driven object for actuating said stroke varying means to control said motor to drive said object toward positional agreement with said pilot device, and means for modifying the actuation of said stroke varying means in accordance with the rate of change of positional disagreement of said pilot device and object comprising a cylinder and a piston movable therein and connected to said stroke varying means and a valve for controlling the admission of fluid pressure to said piston, a second cylinder having a second piston movable therein and a second valve for controlling the admission of fluid pressure to said second cylinder, a link connection between said second piston and second valve, and a second link connection between said first link and said first valve, and means responsive to positional disagreement of said pilot device and driven object for controlling the opening of said second valve.

10. A follow-up system for controlling a driven object to move into positional agreement with a pilot device comprising in combination an hydraulic transmission device for driving said object, said transmission device comprising a variable stroke hydraulic pump, an hydraulic motor supplied from said pump, and means for varying the stroke of said pump, means responsive to positional disagreement of said pilot device and driven object for actuating said stroke varying means to control said motor to drive said object toward positional agreement with said pilot device, and means for modifying the actuation of said stroke varying means in accordance with the rate of change of positional disagreement of said pilot device and object comprising a cylinder and a piston movable therein and connected to said stroke varying means and a valve for controlling the admission of fluid pressure to said piston, a second cylinder having a second piston movable therein and a second valve for controlling the admission of fluid pressure to said second cylinder, a link connection between said second piston and second valve, a second link connection between said first link and said first valve, and an electric motor controlled by positional disagreement of said pilot device and driven object and connected to said first link for opening said second valve.

11. A follow-up system for controlling a driven object to move in correspondence with a pilot device comprising in combination an hydraulic transmission device for driving said object, said hydraulic device having an output shaft connected to said driven object, and a device for controlling the speed of said shaft, means responsive to positional disagreement of said pilot device and driven object for actuating said speed control device to cause said driving means to drive said object toward correspondence with said pilot device, means responsive to the rate of change of said positional disagreement for modifying the actuation of said control device thereby to eliminate hunting, and means responsive to positional disagreement greater than a predetermined value for rendering said rate of change responsive means inactive and actuating said speed control device to drive said object toward correspondence with said pilot device at maximum speed.

12. A follow-up system for controlling a driven object to move into correspondence with a pilot device comprising in combination an hydraulic transmission device for driving said object, said hydraulic device having an output shaft connected to said driven object and means for controlling the speed of said shaft, a cylinder having a piston movable therein and connected to said speed control means, connections from a source of fluid pressure to said cylinder, a valve in said connections for controlling the movement of said piston, means responsive to positional disagreement of said pilot device and driven object for actuating said valve to control said hydraulic device to drive said object toward correspondence with said pilot device, means responsive to the rate of change of said disagreement for modifying the action of said valve to eliminate hunting, a second valve included in said connections between said first valve and speed control device and means responsive to positional disagreement greater than a predetermined value for actuating said second valve to render said first valve inactive and for actuating said speed control device to cause said hydraulic device to drive said object toward correspondence at maximum speed.

13. A follow-up system for controlling a driven object to move into correspondence with a pilot device comprising in combination, an hydraulic transmission device for driving said object, said hydraulic device having an output shaft connected to said driven object and means for controlling the speed of said shaft, a high speed motion transmission system responsive to the positional disagreement of said pilot device and object for controlling said speed control means to drive said object toward correspondence with said pilot device, means responsive to the rate of change of said disagreement for modifying the action of said speed control means to eliminate hunting, and a low speed motion transmission system responsive to a predetermined value of said positional disagreement and a switching device actuated thereby for rendering said high speed transmission system inactive and for controlling said speed control means to drive said object at maximum speed.

14. A follow-up system for controlling a driven object to move into positional agreement with a pilot device comprising an hydraulic transmission device for driving said object, said transmission device having an output shaft, and means for controlling the speed of said shaft, means responsive to positional disagreement of said pilot device and driven object for actuating said speed control means to control said hydraulic transmission device to drive said object toward correspondence with said pilot device, and means for limiting the power output of said transmission device to a predetermined maximum value.

15. A follow-up system comprising in combination a pilot device, a driven object, an hydraulic transmission for driving said object, said transmission device having an output shaft connected to said object and means for controlling the speed of said shaft, a cylinder, a piston movable in said cylinder and connected to said speed controlling means, means responsive to positional disagreement of said pilot device and driven object for controlling the supply of fluid pressure to said cylinder to effect movement of said piston thereby to actuate said speed control means to control said hydraulic transmission device to drive said object toward correspondence with said pilot device, and means for controlling the supply of fluid to said cylinder to limit the power output of said transmission device to a predetermined maximum value.

16. A follow-up system comprising in combination a pilot device, a driven object, an hydraulic transmission device comprising a power driven fluid pump, a fluid motor supplied from said pump, fluid supply and return connections between said pump and motor, and means for controlling said pump to control the speed of said motor, a cylinder, a piston movable in said cylinder connections from a source of fluid pressure to said cylinder, means responsive to positional disagreement of said pilot device and driven object for controlling the supply of fluid pressure through said connections to effect movement of said piston thereby to actuate said speed controlling means to control said driving means to drive said object into correspondence with said pilot device, and means for limiting the power output of said transmission device comprising a valve in the connections from said source to said cylinder and a device responsive to the fluid pressure supplied to said pump, and cooperating with said piston to control said valve.

17. A follow-up system for controlling an object to move into positional agreement with a pilot device comprising in combination an hydraulic transmission device for driving said object, a device for controlling the speed and direction of rotation of said transmission, a cylinder having a piston movable therein for actuating said control device, connections from said cylinder to a source of fluid pressure, a valve in said connections, means responsive to positional disagreement of said pilot device and driven object for actuating said valve to control said transmission device to drive said object toward correspondence with said pilot device, a second valve in said connections between said first valve and said piston, and means operable in limiting positions of said object for controlling said second valve to interrupt the supply of fluid from said first valve to said piston and for supplying fluid to said piston to actuate said control device to stop the driving action of said transmission device.

18. A follow-up system for controlling an object to move into positional agreement with a pilot device comprising in combination an hydraulic transmission device for driving said object, a device for controlling the speed and direction of rotation of said transmission, a cylinder having a piston movable therein for actuating said control device, connections from said cylinder to a source of fluid pressure, a valve in said connections, means responsive to positional disagreement of said pilot device and driven object for operating said valve to control said transmission device to drive said object toward correspondence with said pilot device, a second valve in said connections between said first valve and said piston, means operable in limiting positions of said object for controlling said second valve to interrupt the supply of fluid from said first valve to said piston and for supplying fluid to said piston to actuate said control device to stop the driving action of said transmission device, and check valves in said connections providing for actuation of said piston by said positional disagreement responsive means to cause said transmission device to drive said object away from said limiting position.

References Cited in the file of this patent

UNITED STATES PATENTS

| Number | Name | Date |
|---|---|---|
| 1,481,645 | Kaminski | Jan. 22, 1924 |
| 1,530,445 | Warren | Mar. 17, 1925 |
| 1,612,118 | Hewlett et al. | Dec. 28, 1926 |
| 1,684,132 | Hewlett et al. | Sept. 11, 1928 |
| 2,058,642 | Sperr | Oct. 27, 1936 |
| 2,068,490 | Hull | Jan. 19, 1937 |